United States Patent
Landwehr et al.

(10) Patent No.: US 10,094,233 B2
(45) Date of Patent: Oct. 9, 2018

(54) TURBINE SHROUD

(71) Applicants: Rolls-Royce Corporation, Indianapolis, IN (US); Rolls-Royce North American Technologies, Inc., Indianapolis, IN (US)

(72) Inventors: Sean E. Landwehr, Avon, IN (US); William Westphal, Avon, IN (US); Ted J. Freeman, Danville, IN (US); Adam L. Chamberlain, Mooresville, IN (US)

(73) Assignees: Rolls-Royce Corporation, Indianapolis, IN (US); Rolls-Royce North American Technologies, Inc., Indianapolis, IN (US)

(*) Notice: Subject to any disclaimer, the term of this patent is extended or adjusted under 35 U.S.C. 154(b) by 1513 days.

(21) Appl. No.: 14/095,714

(22) Filed: Dec. 3, 2013

(65) Prior Publication Data

US 2014/0271144 A1    Sep. 18, 2014

Related U.S. Application Data

(60) Provisional application No. 61/779,572, filed on Mar. 13, 2013.

(51) Int. Cl.
*F01D 11/08* (2006.01)
*B23P 15/04* (2006.01)
(Continued)

(52) U.S. Cl.
CPC .............. *F01D 11/08* (2013.01); *B23P 15/04* (2013.01); *F01D 9/04* (2013.01); *F01D 25/246* (2013.01);
(Continued)

(58) Field of Classification Search
CPC .......... F01D 9/04; F01D 11/08; F01D 25/246; F05D 2230/64; F05D 2230/6033; B23P 15/04
(Continued)

(56) References Cited

U.S. PATENT DOCUMENTS

| 3,601,414 A | 8/1971 | Rao |
| 4,087,199 A | 5/1978 | Hemsworth et al. |

(Continued)

FOREIGN PATENT DOCUMENTS

| DE | 102008044450 A1 | 2/2009 |
| EP | 1965030 A2 | 9/2008 |

(Continued)

OTHER PUBLICATIONS

International Search Report and the Written Opinion for International Application No. PCT/US2013/072767, dated Dec. 3, 2013, (10 pages).

(Continued)

*Primary Examiner* — Craig Kim
*Assistant Examiner* — Jason Mikus
(74) *Attorney, Agent, or Firm* — Barnes & Thornburg LLP

(57) ABSTRACT

A turbine shroud for a gas turbine engine includes an annular metallic carrier, a blade track, and a cross-key connection formed between the annular metallic carrier and the ceramic blade track. The cross-key connection is formed between the annular metallic carrier and inserts included in the blade track. The inserts are bonded to an annular runner also included in the blade track by a braze layer.

9 Claims, 12 Drawing Sheets

(51) Int. Cl.
*F01D 9/04* (2006.01)
*F01D 25/24* (2006.01)

(52) U.S. Cl.
CPC .. *F05D 2230/64* (2013.01); *F05D 2300/6033* (2013.01); *Y02T 50/672* (2013.01); *Y10T 29/49321* (2015.01)

(58) Field of Classification Search
USPC ........................................................ 415/173.1
See application file for complete search history.

(56) References Cited

U.S. PATENT DOCUMENTS

| | | | |
|---|---|---|---|
| 4,477,086 A | 10/1984 | Feder et al. | |
| 4,646,810 A | 3/1987 | Lardellier | |
| 4,679,981 A | 7/1987 | Guibert et al. | |
| 4,863,345 A | 9/1989 | Thompson et al. | |
| 4,986,737 A * | 1/1991 | Erdmann | B23P 15/006 416/190 |
| 5,163,809 A | 11/1992 | Akgun et al. | |
| 5,738,490 A | 4/1998 | Pizzi | |
| 6,142,731 A | 11/2000 | Dewis et al. | |
| 6,315,519 B1 | 11/2001 | Bagepalli et al. | |
| 6,517,313 B2 | 2/2003 | Rogers | |
| 6,726,448 B2 | 4/2004 | McGrath et al. | |
| 6,733,233 B2 | 5/2004 | Jasklowski et al. | |
| 6,758,386 B2 | 7/2004 | Marshall et al. | |
| 6,758,653 B2 | 7/2004 | Morrison | |
| 6,896,483 B2 | 5/2005 | Dierksmeier et al. | |
| 6,910,853 B2 | 6/2005 | Corman et al. | |
| 7,090,459 B2 | 8/2006 | Bhate et al. | |
| 7,195,452 B2 | 3/2007 | Allan et al. | |
| 7,217,089 B2 | 5/2007 | Durocher et al. | |
| 7,234,306 B2 | 6/2007 | Aumont et al. | |
| 7,374,396 B2 | 5/2008 | Martin et al. | |
| 7,435,049 B2 | 10/2008 | Ghasripoor et al. | |
| 7,641,442 B2 | 1/2010 | Denece et al. | |
| 7,665,960 B2 | 2/2010 | Shi et al. | |
| 7,771,160 B2 | 8/2010 | Shi et al. | |
| 7,914,256 B2 | 3/2011 | Xie et al. | |
| 7,988,395 B2 | 8/2011 | Steffier | |
| 8,047,773 B2 | 11/2011 | Bruce et al. | |
| 8,061,977 B2 | 11/2011 | Keller et al. | |
| 8,079,807 B2 | 12/2011 | Shapiro et al. | |
| 8,092,160 B2 | 1/2012 | Shi et al. | |
| 8,167,546 B2 | 5/2012 | Shi et al. | |
| 8,206,094 B2 * | 6/2012 | Seki | F01D 5/225 415/191 |
| 8,235,670 B2 | 8/2012 | Morrison et al. | |
| 8,257,029 B2 | 9/2012 | Habarou et al. | |
| 8,322,983 B2 | 12/2012 | Marini | |
| 8,328,505 B2 | 12/2012 | Shi et al. | |
| 8,496,431 B2 | 7/2013 | Habarou et al. | |
| 8,511,975 B2 | 8/2013 | Shi et al. | |
| 8,555,647 B2 | 10/2013 | Dimascio et al. | |
| 8,568,091 B2 | 10/2013 | McCaffrey | |
| 8,651,497 B2 | 2/2014 | Tholen et al. | |
| 8,684,689 B2 | 4/2014 | Guo et al. | |
| 8,739,547 B2 | 6/2014 | Jarmon et al. | |
| 8,740,552 B2 | 6/2014 | Marusko et al. | |
| 8,770,931 B2 | 7/2014 | Alvanos et al. | |
| 8,784,052 B2 | 7/2014 | Shi et al. | |
| 8,790,067 B2 | 7/2014 | McCaffrey et al. | |
| 8,801,372 B2 | 8/2014 | Shi et al. | |
| 8,814,173 B2 | 8/2014 | Motzkus et al. | |
| 8,834,106 B2 | 9/2014 | Luczak | |
| 8,926,270 B2 | 1/2015 | Karafillis et al. | |
| 9,011,079 B2 | 4/2015 | Coign et al. | |
| 2004/0047726 A1 | 3/2004 | Morrison | |
| 2009/0208322 A1 | 8/2009 | McCaffrey | |
| 2010/0111678 A1 | 5/2010 | Habarou et al. | |
| 2010/0150703 A1 | 6/2010 | Gonzalez et al. | |
| 2010/0232941 A1 | 9/2010 | Smoke et al. | |
| 2011/0052384 A1 | 3/2011 | Shi et al. | |
| 2011/0057394 A1 | 3/2011 | Halling | |
| 2011/0150635 A1 | 6/2011 | Motzkus et al. | |
| 2011/0274538 A1 | 11/2011 | Shi et al. | |
| 2012/0070276 A1 | 3/2012 | Shi et al. | |
| 2012/0107107 A1 * | 5/2012 | Chan | F01D 11/001 415/182.1 |
| 2012/0156029 A1 | 6/2012 | Karafillis et al. | |
| 2012/0177488 A1 | 7/2012 | Corman | |
| 2012/0247124 A1 * | 10/2012 | Shapiro | F01D 9/04 60/805 |
| 2012/0263582 A1 | 10/2012 | Foster et al. | |
| 2012/0301269 A1 | 11/2012 | Alvanos et al. | |
| 2012/0301303 A1 | 11/2012 | Alvanos et al. | |
| 2012/0301312 A1 | 11/2012 | Berczik et al. | |
| 2012/0308367 A1 | 12/2012 | Luczak et al. | |
| 2013/0008176 A1 | 1/2013 | Shi et al. | |
| 2013/0011248 A1 | 1/2013 | Croteau et al. | |
| 2013/0177384 A1 | 7/2013 | Coign et al. | |
| 2013/0177411 A1 | 7/2013 | Weber et al. | |
| 2014/0202168 A1 | 7/2014 | Shapiro et al. | |
| 2014/0260320 A1 | 9/2014 | Graves et al. | |
| 2014/0271144 A1 | 9/2014 | Landwehr et al. | |
| 2015/0044044 A1 | 2/2015 | Sippel et al. | |
| 2016/0123171 A1 | 5/2016 | Westphal et al. | |
| 2016/0177786 A1 | 6/2016 | Sippel et al. | |
| 2016/0208635 A1 | 7/2016 | Vetters et al. | |
| 2016/0222812 A1 | 8/2016 | Sippel et al. | |

FOREIGN PATENT DOCUMENTS

| | | | |
|---|---|---|---|
| EP | 2589774 A1 | 5/2013 | |
| EP | 2604805 A2 | 6/2013 | |
| FR | 2580033 A1 | 10/1986 | |
| FR | WO 2011157956 A1 * | 12/2011 | ............... F01D 5/26 |
| FR | WO 2011157957 A1 * | 12/2011 | ............... F01D 5/26 |
| GB | 2235730 A | 3/1991 | |
| GB | 2468768 A | 9/2010 | |
| GB | 2480766 A | 11/2011 | |
| JP | 09250304 A | 9/1997 | |
| JP | 09264104 A | 10/1997 | |
| WO | 2010058137 A1 | 5/2010 | |
| WO | 2014120334 A1 | 8/2014 | |
| WO | 2014143225 A1 | 9/2014 | |
| WO | 2014163674 A1 | 10/2014 | |

OTHER PUBLICATIONS

Corman, Gregory S. and Luthra, Krishan L.; Melt Infiltrated Ceramic Composites (HIPERCOMP®) for Gas Turbine Engine Applications; DOE/CE/41000-3; May 1994-Sep. 2005; pp. 1-507.

Blosser, Max L.; Thermal Stress in High Temperature Cylindrical Fasteners; NASA Technical Memorandum; May 1988; pp. 1-12.

Blosser, Max L. and McWithey, Robert R.; Theoretical Basis for Design of Thermal-Stress-Free Fasteners; NASA Technical Paper; Dec. 1983; pp. 1-26.

* cited by examiner

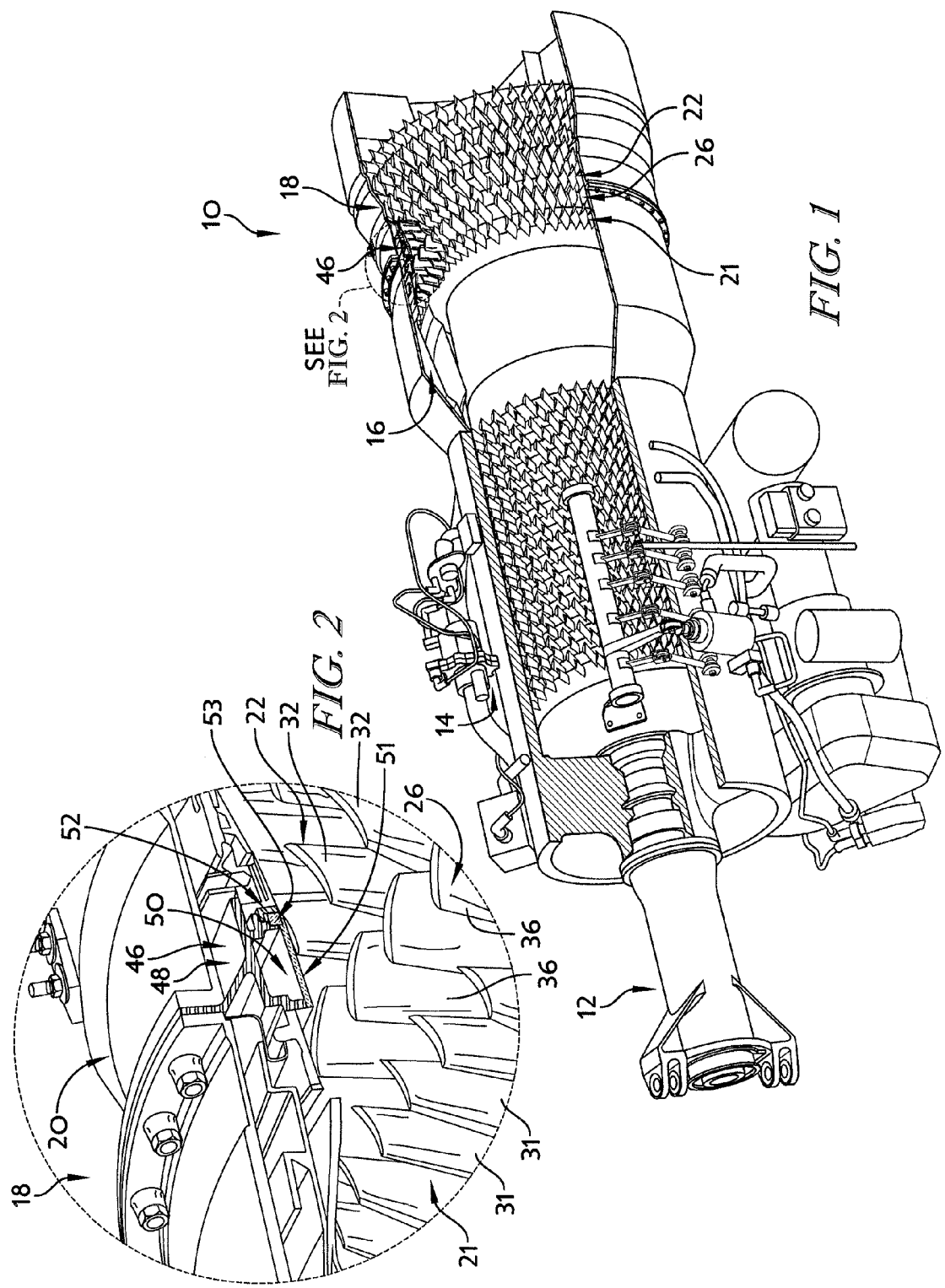

TURBINE SHROUD

This application claims priority to and the benefit of U.S. Provisional Patent Application No. 61/779,572, filed 13 Mar. 2013, the disclosure of which is now incorporated herein by reference.

FIELD OF THE DISCLOSURE

The present disclosure relates generally to gas turbine engines, and more specifically to turbine shrouds used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products. For example, coupling such components with traditional fasteners such as rivets or bolts may not allow for the differing levels of expansion and contraction during operation of the gas turbine engine.

SUMMARY

The present application discloses one or more of the features recited in the appended claims and/or the following features which, alone or in any combination, may comprise patentable subject matter.

A turbine shroud for use in the turbine section of a gas turbine engine is disclosed in this paper. The turbine shroud is adapted to extend around a rotatable turbine wheel assembly having a wheel and blades. The turbine shroud blocks hot gasses flowing through the turbine section from passing over the blades without pushing the blades. By ensuring that the hot gasses push the blades, the turbine shroud helps cause the turbine wheel assembly to rotate when hot gasses are driven through the turbine section from a combustion section of the gas turbine engine. Rotation of the turbine wheel assembly can then be used to drive a compressor, a fan, a propeller, a generator, or other modules coupled to the turbine wheel assembly.

In illustrative embodiments, the turbine shroud disclosed includes an annular ceramic runner that is illustratively made from a ceramic matrix composite material adapted to withstand high temperatures. The ceramic runner is formed to include a plurality of cutouts that extend inward from an outer radial surface of the annular ceramic runner toward an inner radial surface of the annular ceramic runner. The turbine shroud also includes a plurality of inserts each arranged to extend into a corresponding cutout. Each insert is held in its corresponding cutout by a braze layer.

In illustrative embodiments, the turbine shroud disclosed includes a metallic carrier adapted to be coupled to other metallic components of the turbine section to hold the ceramic runner in place relative to the rest of the turbine section. More specifically, the metallic carrier holds the ceramic runner radially between the metallic carrier and the turbine wheel assembly to insulate the annular metallic carrier from the hot gasses directed at the blades of the turbine wheel assembly.

In illustrative embodiments, the plurality of inserts coupled engage with the metallic carrier to form a cross-key connection between the ceramic runner and the metallic carrier. The cross-key connection locates the ceramic blade track relative to the metallic carrier while allowing the metallic carrier and the ceramic blade track to expand and contract at different rates based on temperature.

These and other features of the present disclosure will become more apparent from the following description of the illustrative embodiments.

BRIEF DESCRIPTION OF THE DRAWINGS

FIG. 1 is a cut-away perspective view of a gas turbine engine including a turbine section;

FIG. 2 is a detail view of FIG. 1 showing a turbine shroud providing a track for blades of a turbine wheel assembly;

DETAILED DESCRIPTION OF THE DRAWINGS

Figure 3:
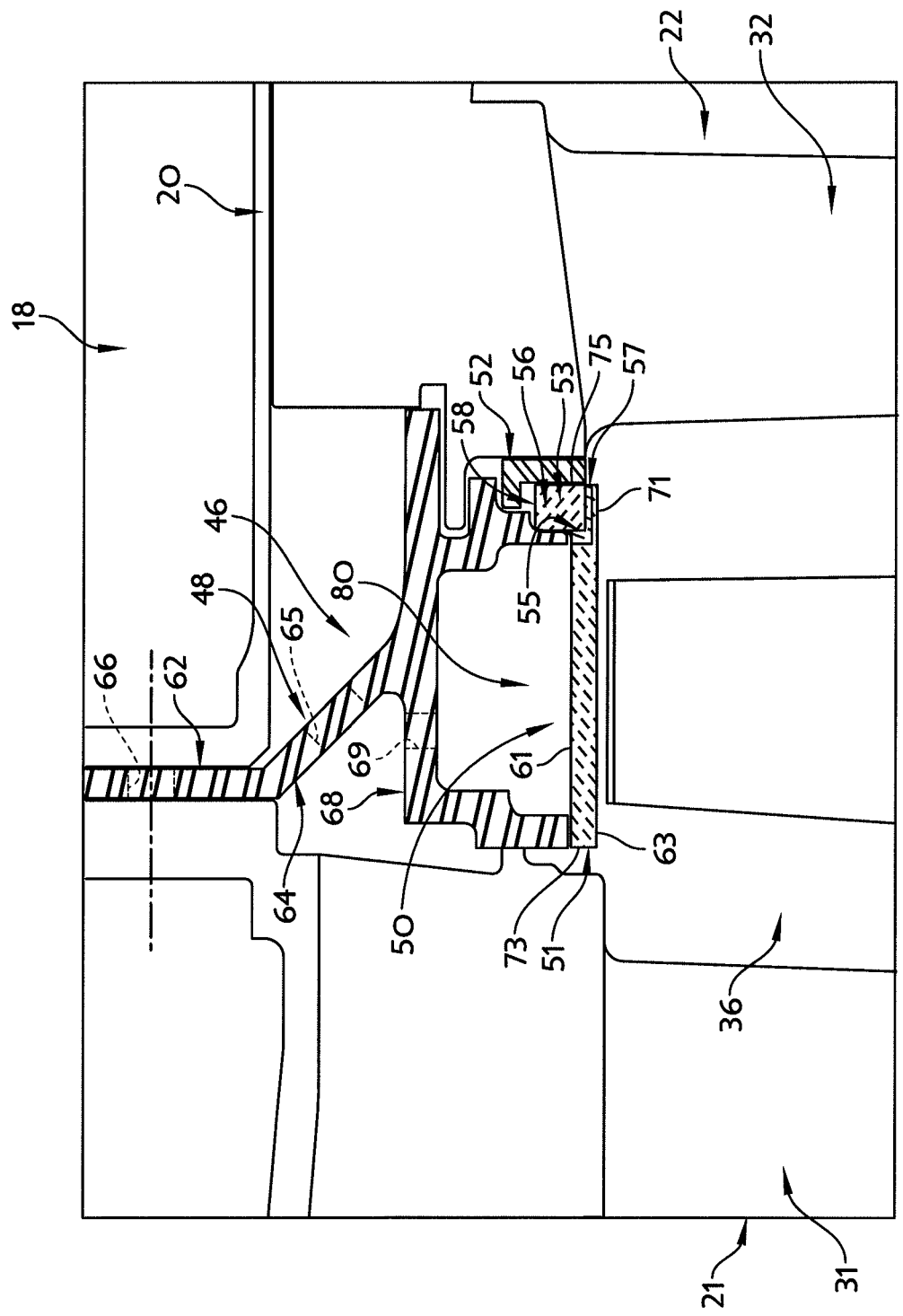
FIG. 3 is a partial cross-sectional view of the gas turbine engine of FIG. 1 showing the arrangement of the turbine shroud in the gas turbine engine.

For the purposes of promoting an understanding of the principles of the disclosure, reference will now be made to a number of illustrative embodiments illustrated in the drawings and specific language will be used to describe the same.

FIG. 1 is an illustrative aerospace gas turbine engine 10 cut-away to show that the engine 10 includes an output shaft 12, a compressor 14, a combustor 16, and a turbine 18 all mounted to a case 20. The output shaft 12 is configured to be coupled to a propeller (not shown) and is driven by the turbine 18. The compressor 14 is configured compress and deliver air to the combustor 16. The combustor 16 is configured to mix fuel with the compressed air received from the compressor 14 and to ignite the fuel. The hot high pressure products of the combustion reaction in the combustor 16 are directed into the turbine 18 and the turbine 18 extracts work to drive the compressor 14 and the output shaft 12.

The turbine 18 illustratively includes static turbine vane assemblies 21, 22, etc. and corresponding turbine wheel assemblies 26 etc. as shown in FIG. 1. Each vane assembly 21, 22, etc. includes a plurality corresponding of vanes 31, 32, etc. and each turbine wheel assembly 26 etc. includes a plurality of corresponding blades 36 etc. The vanes 31, 32, etc. of the vane assemblies 21, 22, etc. extend across the flow path of the hot, high-pressure combustion products from the combustor 16 to direct the combustion products toward the blades 36 etc. of the turbine wheel assemblies 26 etc. The blades 36 etc. are in turn pushed by the combustion products to cause the turbine wheel assemblies 26 etc. to rotate; thereby, driving the rotating components of the compressor 14 and the output shaft 12.

The turbine 18 also includes a plurality of turbine shrouds 46, 47, etc. that extend around each turbine wheel assembly 26 etc. to block combustion products from passing over the blades 36 etc. without pushing the blades 36 etc. to rotate. An exemplary first stage turbine shroud 46, shown in FIG. 2, extends around a first stage turbine wheel assembly 26 and is sized to block most combustion products from passing over the blades 36 without pushing the blades 36 to rotate as suggested in FIG. 4. Combustion products that are allowed to pass over the blades 36 do not push the blades 36 and such passed-over products contribute to lost performance within the engine 10.

The turbine shroud 46 illustratively includes a carrier 48, a blade track (sometimes called seal ring) 50, and a retainer 52 as shown in FIGS. 2 and 3. The carrier 48 is an annular, round metallic component and is configured to support the blade track 50 in position adjacent to the blades 36 of the turbine wheel assembly 26. The illustrative blade track 50 is concentric with and nested into the carrier 48 along a rotational axis 11 of the engine 10. The retainer 52 engages both the carrier 48 and the blade track 50 to position the carrier 48 and the blade track relative to other static turbine components.

Figure 4:
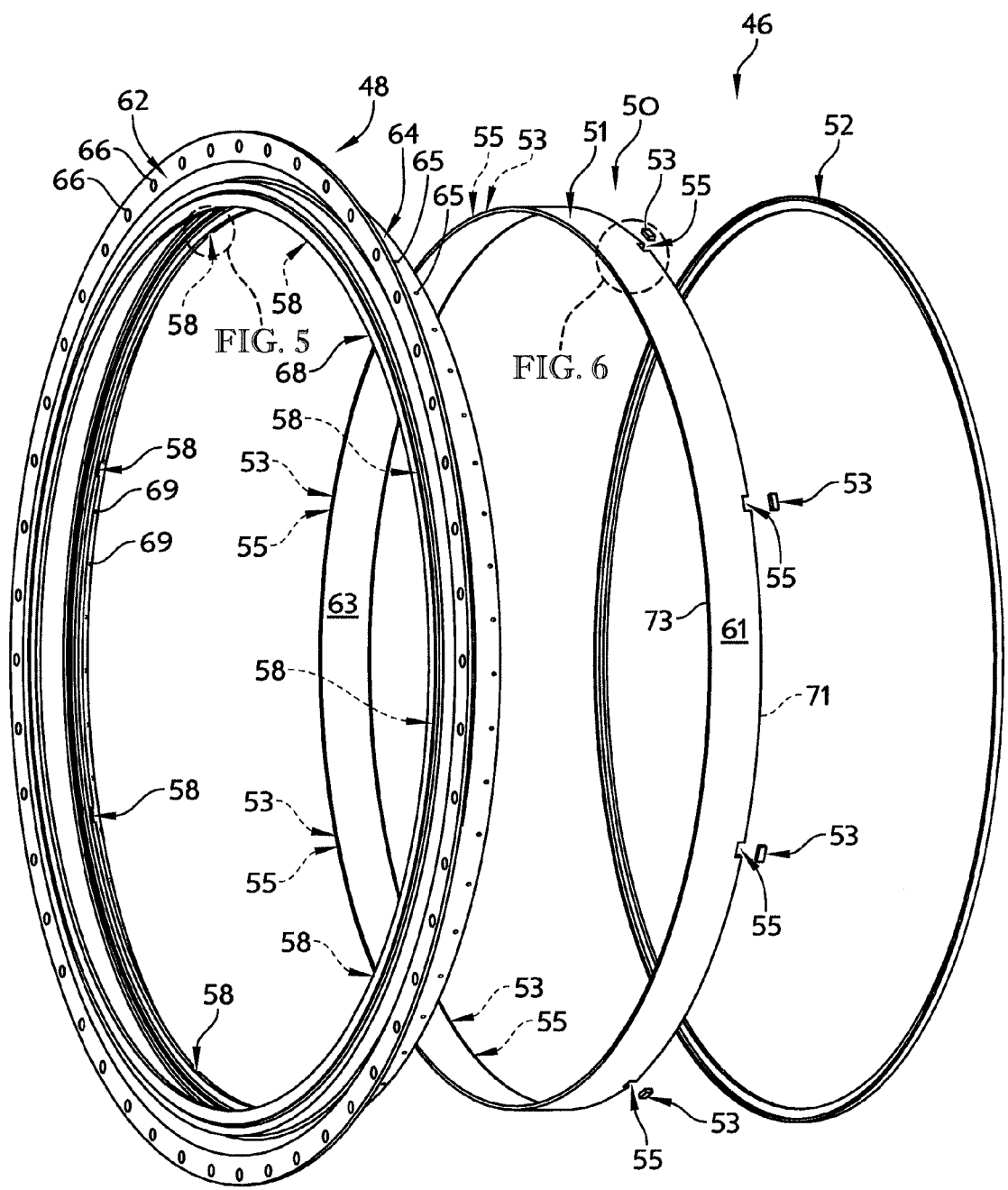
FIG. 4 is an exploded perspective view of the turbine shroud included in the gas turbine engine shown in FIGS. 1 and 2 showing that the turbine shroud includes a carrier, a blade track, and a retainer.

In the illustrative embodiment, the blade track 50 includes an annular runner 51 and a plurality of inserts 53 as shown in FIG. 4. The annular runner 51 is illustratively formed to include a plurality of cutouts 55 spaced circumferentially apart and sized to receive the plurality of inserts 53 as suggested in FIGS. 4 and 6-8. The plurality of inserts 53 are coupled to the annular runner 51 by arranging each insert 53 in a corresponding cutout 55 and bonding the inserts 53 to the annular runner 51 via brazing which adds a braze layer 57 between the annular runner 51 and each insert 53 as shown in FIGS. 7 and 8.

In some embodiments, instead of bonding the inserts 53 to the annular runner 51 using a braze layer 57, the inserts 53 may be integrally woven into a preform that is later hardened to create the annular runner 51 so that the inserts are bonded to the annular runner 51. In some such embodiments, the inserts 53 are machined after hardening of the annular runner 51 so that the inserts 53 have a predetermined shape/orientation relative to the geometry of the annular runner 51.

In some embodiments, instead of bonding the inserts 53 to the annular runner 51 using a braze layer 57, the inserts 53 may be welded to the annular runner 51 creating a weld between the inserts 53 and the annular runner 51 (similar to the braze layer 57). Filler materials would be used to form the welds and such filler materials may include silicon, a transition metal silicide, and/or a MAX phase material.

The annular runner 51 is illustratively made from a ceramic material; and, more particularly, a ceramic matrix composite (CMC) including silicon carbide fibers and silicon carbide matrix. For purposes of this application, a ceramic material is any monolithic ceramic or composite in which at least one constituent is a ceramic. In other embodiments, the annular runner 51 may be made of other metallic, non-metallic, or composite materials with low coefficients of thermal expansion.

Similarly, in the illustrative embodiment, each insert 53 is made from a ceramic material; and, more particularly, a ceramic matrix composite (CMC) including silicon carbide fibers and silicon carbide matrix. In other embodiments, each insert 53 may be made from monolithic silicon carbide, dense chopped fiber reinforced silicon carbide, monolithic silicon nitride based materials, monolitihic aluminum oxide, whisker reinforced aluminum oxide, and/or MAX phase materials (e.g. $Ti_3SiC_2$, $Ti_2AlC$, etc.). In still other embodiments, each insert 53 may be made of other metallic, non-metallic, or composite materials with low coefficients of thermal expansion that are compatible with both the carrier 48 and the annular runner 51.

The braze layer 57 is illustratively made from a transition metal and silicon. More particularly, some embodiments of the illustrative braze layer 57 include a combination of molybdenum (Mo) and silicon (Si), a combination of Niobium (Nb) and silicon (Si), or a combination of titanium (Ti) and silicon (Si). In some embodiments, the braze layer 57 may also include fluxing agents such as boron (B) and/or carbon (C). In some embodiments, the braze layer may include filler materials such as silicon carbide, polycarbosilanes, carbon, MAX phase materials, aluminum oxide, or other types of filler.

The illustrative inserts 53 extend outward in the radial direction from the annular runner 51 as shown in FIGS. 7 and 8. Each insert 53 is arcuate when viewed in the axial direction (meaning inner and outer radial surfaces are curved to match the annular runner 51) as shown in FIG. 8. However, in other embodiments, each insert 53 may rectangular or may have another shape when viewed in the axial direction. When viewed in the radial or axial directions, sides of each insert 53 are perpendicular to a radial center line of the annular runner 51. Additionally, in the illustrative embodiment, an aft axial surface 75 of the illustrative insert 53 is coplanar with an aft axial surface 71 of the annular runner 51.

Figure 6:
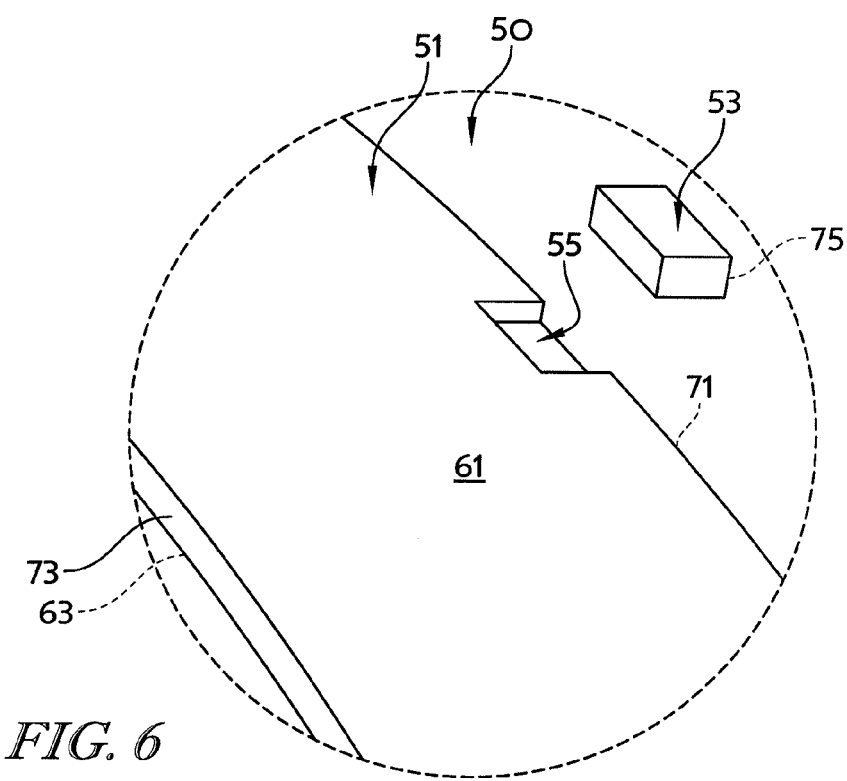
FIG. 6 is a detail perspective view of the blade track included in the turbine shroud of FIGS. 3 and 4 showing that the blade track includes an annular runner and an arcuate insert.
Figure 7:
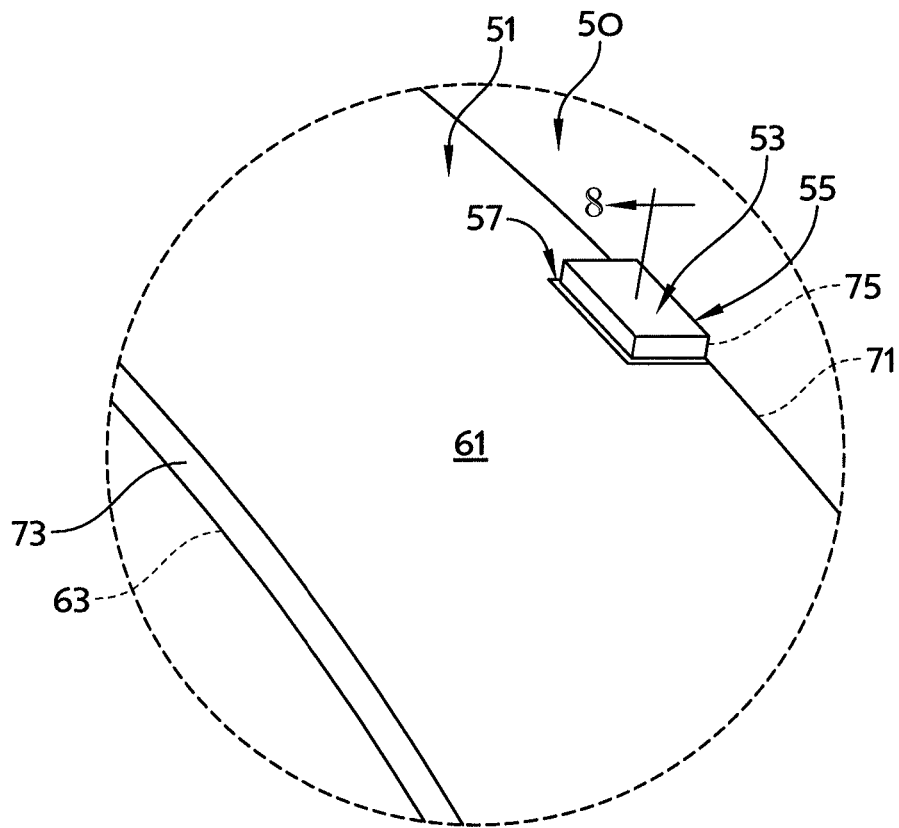
FIG. 7 is a detail perspective view of the blade track shown in FIG. 6 with the insert coupled to the annular runner to provide a radially extending key.
Figure 8:
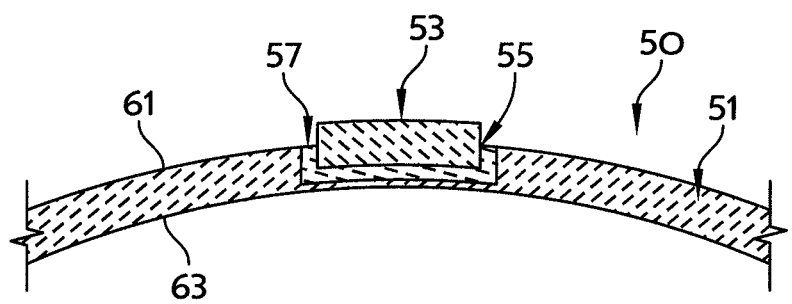
FIG. 8 is a cross-sectional view of the blade track of FIG. 7 showing that the insert extends partway through the annular runner and is coupled to the annular runner by a braze layer.
Figure 11:
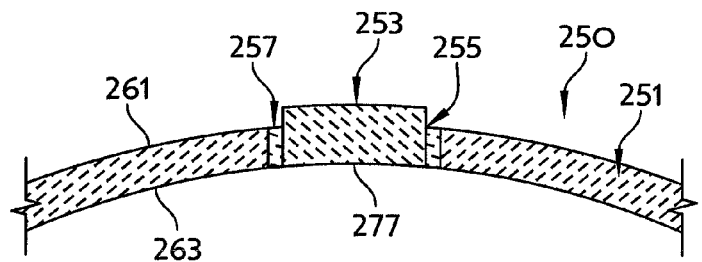
FIG. 11 is a cross-sectional view of the blade track of FIG. 10 showing that the insert extends all the way through the annular runner and is coupled to the annular runner by braze layers.

The cutouts 55 are illustratively arcuate and sized to receive a portion of the insert 53 as shown in FIGS. 6-8. In other embodiments, the cutouts may be other shapes corresponding to the inserts 53. Additionally, the illustrative cutouts 55 extend inward in a radial direction partway through the annular runner 51 from an outer radial surface 61 toward an inner radial surface 63 of the annular runner 51 as shown in FIG. 6. In other embodiments, the cutouts 55 may extend all the way through the annular runner 51 in the radial direction (as shown in FIG. 11). Further, the illustrative cutouts 55 extend in an axial direction partway through the annular runner 51 from the aft axial surface 71 toward a forward axial surface 73 of the annular runner 51.

The annular runner 51 has a relatively low coefficient of thermal expansion because of its composition. The illustrative annular runner 51 has a coefficient of thermal expansion of between about 1.0 and 4.0 in/in/F. Considering this relatively small coefficient of thermal expansion, the annular runner 51 can be designed to maintain a small gap between the blade track 50 and the blades 36 thereby improving performance of the engine 10.

Additionally, the annular runner 51 is a unitary component forming a full hoop as shown in FIG. 4. The annular runner 51 is a component of one-piece, continuous construction, rather than as a series of joined segments. This construction eliminates gaps that may be formed between parts of a multi-piece (or segmented) runner. The one-piece full hoop of the annular runner 51 encourages uniform radial expansion of the blade track 50 at high temperatures. Uniform radial expansion of the blade track 50 allows the blade track 50 to remain round at high temperatures which results in the ability to further maintain a small gap between the blades 36 and the blade track 50 while hot combustion products are being directed over the blades 36 and the blade track 50.

To accommodate the connection of the CMC blade track 50 to the metallic carrier 48 (which has a relatively high coefficient of thermal expansion, illustratively between about 5.0 and 10.0 in/in/F), the turbine shroud 46 includes a cross-key connection 54 that is formed between the carrier 48 and the blade track 50 as shown, for example, in FIGS. 2 and 4. The cross-key connection 54 locates the blade track 50 relative to the carrier 48 while allowing radial translation of the blade track 50 relative to the carrier 48. The cross-key connection 54 illustratively includes a plurality of keys 56 and a plurality of corresponding keyways 58 sized and arranged to receive the plurality of keys 56.

Figure 5:
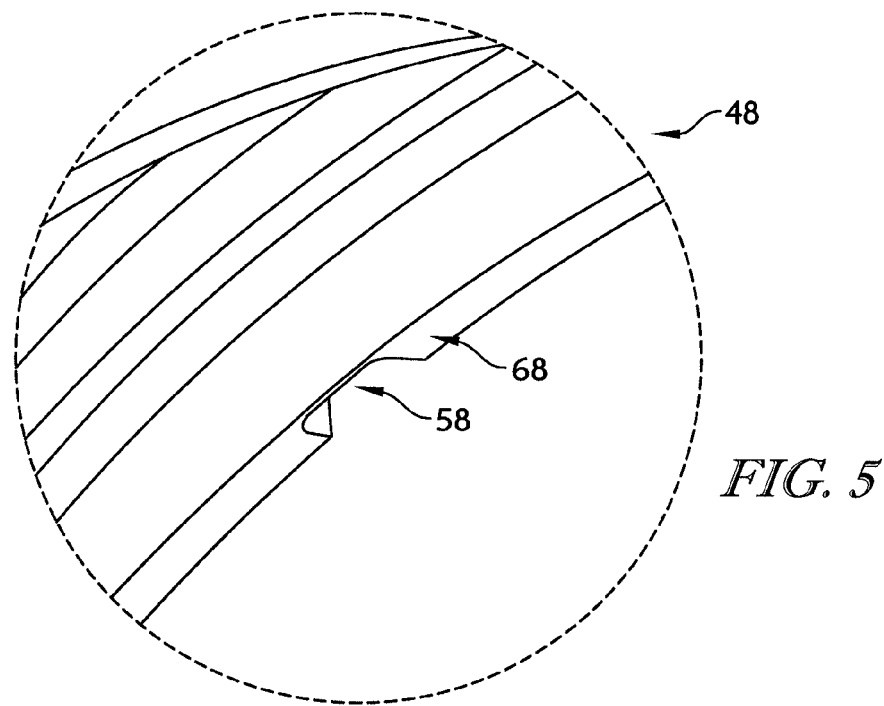
FIG. 5 is a detail perspective view of the carrier included in the turbine shroud shown in FIG. 4.

In the illustrative embodiment, the keys 56 are provided by a portion of each inserts 53 that extends outward in the radial direction from the annular runner 51. In other embodiments, the keys may be integrated with the annular runner 51 as described in U.S. Provisional Application No. 61/758,023, filed Jan. 29, 2013, which is hereby incorporated by reference herein. The keyways 58 are formed in the carrier 48 and extend outward in the radial direction into the carrier 48 as shown in FIG. 5.

Referring now to FIG. 4, the carrier 48 is illustratively formed to include a connection flange 62, a connector 64, and a support band 68. The connection flange 62 is formed to include a bolt-hole pattern 66 adapted to be bolted between a combustor-case section 76 and a turbine-case section 78 included in the case 20. In another embodiment, the connection flange 62 could be hung from the case rather than bolted. The connector 64 extends inwardly in the radial direction and rearwardly in an axial direction from the connection flange 62 to form a frustoconical shape. The support band 68 extends inwardly in the radial direction from the connector 64 and the connection flange 62.

The support band 68 forms a downwardly-opening channel 80 that faces the blade track 50 as shown in FIG. 4. The downwardly-opening channel 80 is exposed to fluid communication with air radially outwardly of the blade track 50 via a vent hole pattern 69 formed in the support band 68 and a vent hole pattern 65 formed in the connector 64. In the illustrative embodiment, the plurality of keyways 58 extend outward in the radial direction into the support band 68 as shown in FIG. 5.

The retainer 52 is an annular metallic ring with a linear cross section as shown in FIGS. 3 and 4. The retainer 52 engages the aft side 82 of the support band 68 and the aft side 71 of the blade track 50 to locate the carrier 48 and the blade track 50 relative to the second stage vane assembly 22 as shown in FIG. 3. In the illustrative embodiment, the retainer 52 has a coefficient of thermal expansion between about 5.0 in/in/F and 10.0 in/in/F. In other embodiments, the retainer 52 may be a non-metallic or ceramic component with a coefficient of thermal expansion between about 1.0 in/in/F and about 4.0 in/in/F.

According to at least one method of assembling the turbine shroud 46, a user first places each of the inserts 53 into a corresponding cutout 55 formed in the annular runner 51. Then the user brazes the inserts 53 in place forming the braze layer 57 between each insert 53 and the annular runner 51 to form the blade track 50.

When the blade track 50 is completed, the user rotates the blade track 50 to a predetermined orientation relative to the retainer 48 so that the keys 56 are aligned corresponding keyways 58. Then the user nests the blade track 50 into the retainer 48 so that the blade track 50 is concentric with the retainer. Next, the user inserts the keys 56 of the blade track 50 into the corresponding keyways 58 formed in the carrier 48 to thereby establish the cross-key connection 54 between the blade track 50 and the carrier 48.

Figure 9:
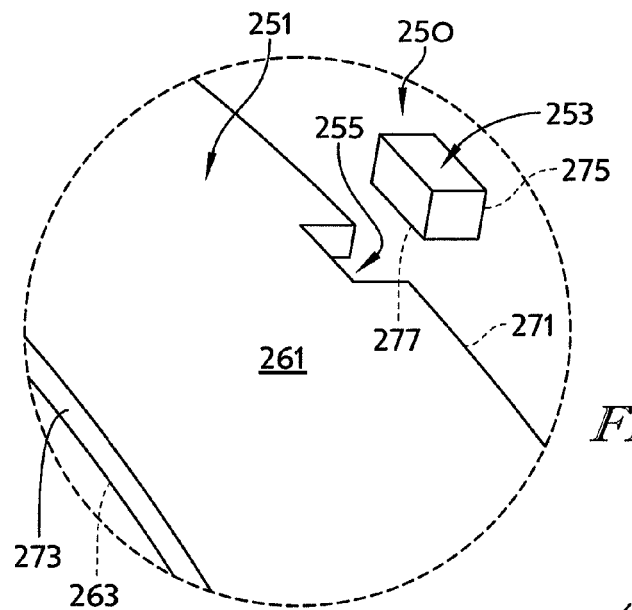
FIG. 9 is a detail perspective view of another blade track adapted for use in the turbine shroud of FIGS. 3 and 4 showing that the blade track includes an annular runner and an arcuate insert.
Figure 10:
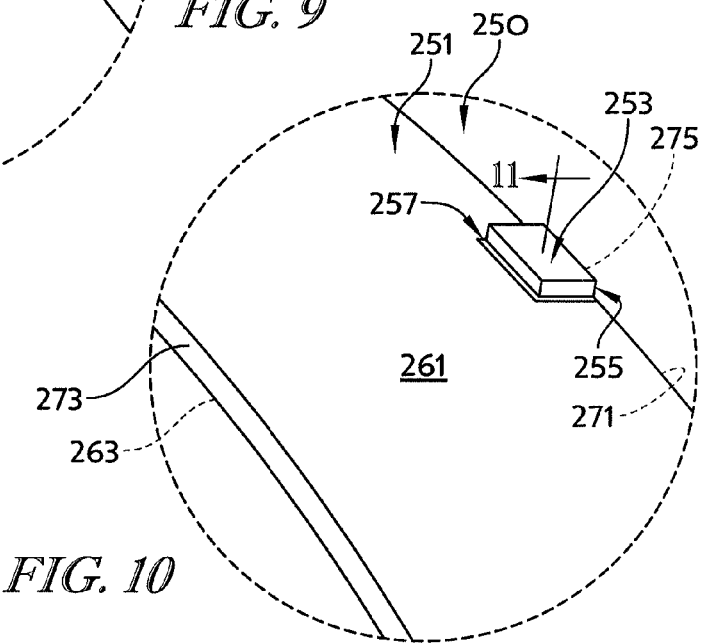
FIG. 10 is a detail perspective view of the blade track shown in FIG. 9 with the insert coupled to the annular runner to provide a radially extending key.

Another illustrative blade track 250 is shown in FIGS. 9-11. The blade track 250 is configured for use in engine 10 and is substantially similar to the blade track 50 shown in FIGS. 1-8 and described herein. Accordingly, similar reference numbers in the 200 series indicate features that are common between the blade track 50 and the blade track 250. The description of the engine 10 and the blade track 50 is hereby incorporated by reference to apply to the blade track 250, except in instances when it conflicts with the specific description and drawings of the blade track 250.

Unlike blade track 50, the cutout 255 of the annular runner 251 included in the blade track 250 extends all the way through the annular runner 251 from the outer radial surface 261 through the inner radial surface 263 as shown in FIG. 11. Additionally, the inserts 253 are arcuate (meaning inner and outer radial surfaces are curved to match the annular runner 251) and are coupled to the annular runner 251 so that an inner radial surface 277 of each insert is coextensive with the inner radial surface 263 of the annular runner 251 as shown in FIG. 11. In some embodiments, only the inner radial surface 277 of the inserts 253 are arcuate. Additionally, in some embodiments, the inserts 253 are rectangular or have another shape.

Figure 12:
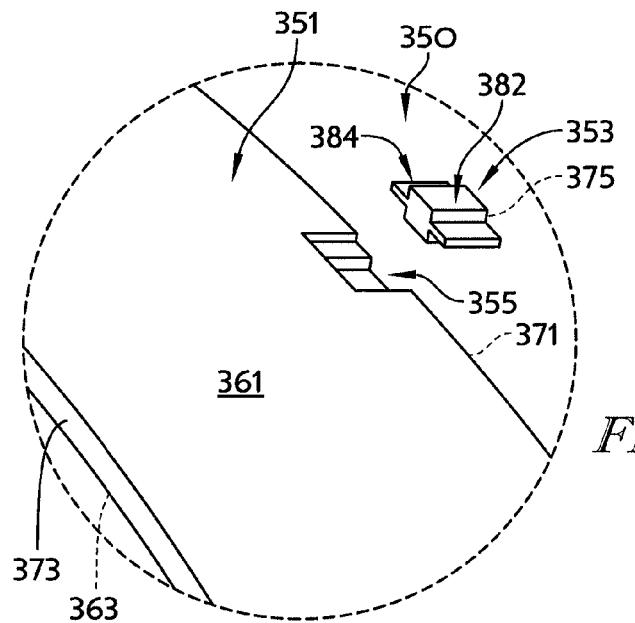
FIG. 12 is a detail perspective view of the blade track included in the turbine shroud of FIGS. 3 and 4 showing that the blade track includes an annular runner and a cross-shaped insert.
Figure 13:
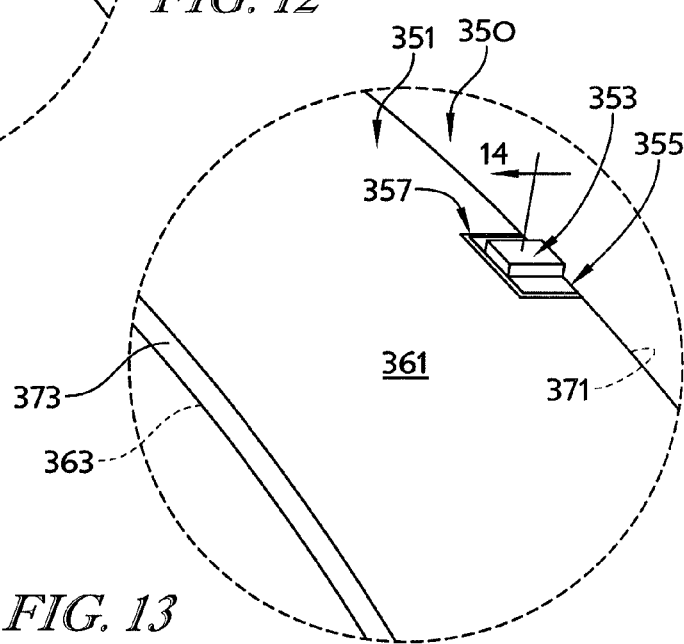
FIG. 13 is a detail perspective view of the blade track shown in FIG. 12 with the insert coupled to the annular runner to provide a radially extending key.
Figure 14:
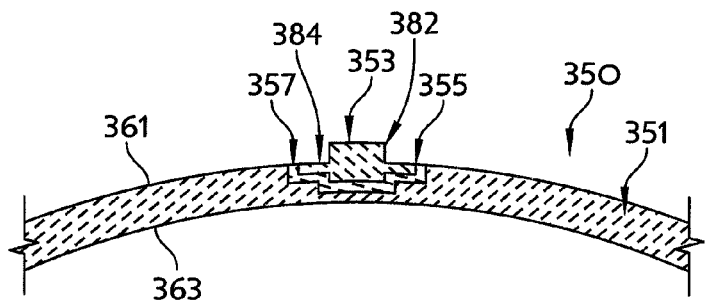
FIG. 14 is a cross-sectional view of the blade track of FIG. 13 showing that the insert extends partway through the annular runner and is coupled to the annular runner by a braze layer.

Another illustrative blade track 350 is shown in FIGS. 12-14. The blade track 350 is configured for use in engine 10 and is substantially similar to the blade track 50 shown in FIGS. 1-8 and described herein. Accordingly, similar reference numbers in the 300 series indicate features that are common between the blade track 50 and the blade track 350. The description of the engine 10 and the blade track 50 is hereby incorporated by reference to apply to the blade track 350, except in instances when it conflicts with the specific description and drawings of the blade track 350.

Unlike blade track 50, the insert 353 of the blade track 350 is cross-shaped when viewed in the axial direction as shown in FIGS. 12 and 14. The insert 353 includes a radially extending member 382 and an arcuate (meaning inner and outer radial surfaces are curved to match the annular runner 351) circumferentially-extending member 384 as shown in FIGS. 12 and 14. The cutout 355 is T-shaped when viewed in the axial direction to receive a portion of both of the members 382, 384 that make up the insert 353. On account of the complementary shapes of the insert 353 and the cutout 355, the surface area of the annular runner 351 and the insert 353 bonded by the braze layer 357 can be adjusted while maintaining a predetermined size of the key 356.

Figure 15:
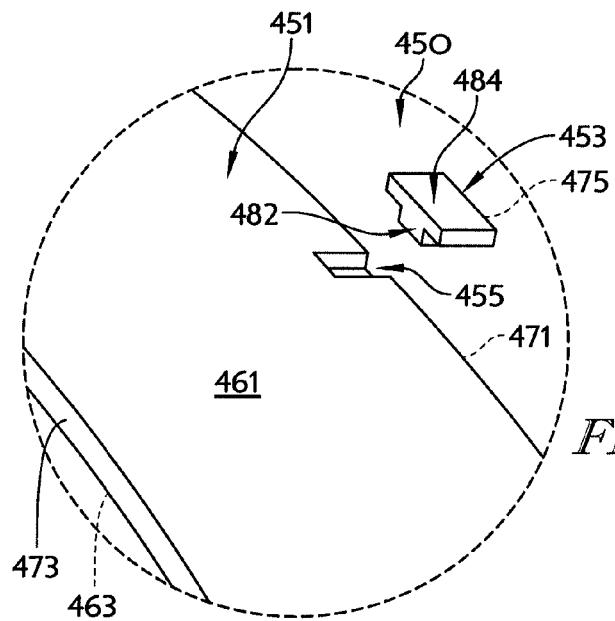
FIG. 15 is a detail perspective view of the blade track included in the turbine shroud of FIGS. 3 and 4 showing that the blade track includes an annular runner and a T-shaped insert.
Figure 16:
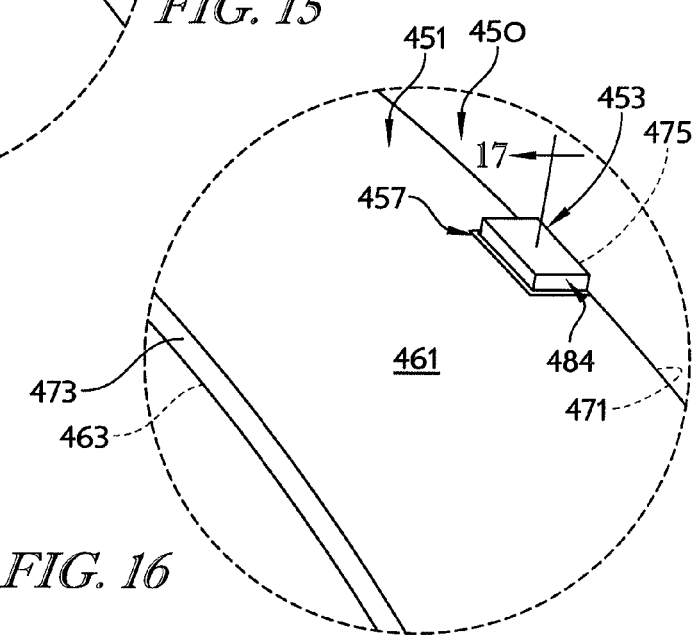
FIG. 16 is a detail perspective view of the blade track shown in FIG. 15 with the insert coupled to the annular runner to provide a radially extending key.
Figure 17:
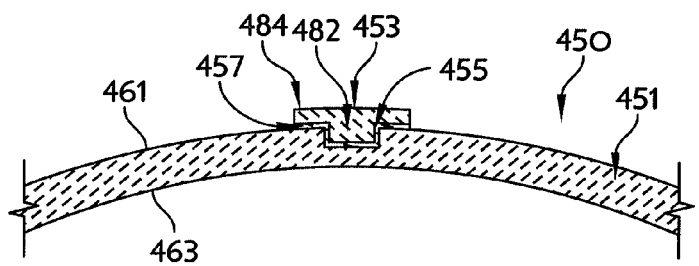
FIG. 17 is a cross-sectional view of the blade track of FIG. 16 showing that the insert extends partway through the annular runner and is coupled to the annular runner by a braze layer.

Another illustrative blade track 450 is shown in FIGS. 15-17. The blade track 450 is configured for use in engine 10 and is substantially similar to the blade track 50 shown in FIGS. 1-8 and described herein. Accordingly, similar reference numbers in the 400 series indicate features that are common between the blade track 50 and the blade track 450. The description of the engine 10 and the blade track 50 is hereby incorporated by reference to apply to the blade track 450, except in instances when it conflicts with the specific description and drawings of the blade track 450.

Unlike blade track 50, the insert 453 of the blade track 450 is T-shaped when viewed in the axial direction as shown in FIGS. 15 and 17. The insert 453 includes a radially extending member 482 and an arcuate (meaning inner and outer radial surfaces are curved to match the annular runner 451) circumferentially-extending member 484 as shown in FIGS. 15 and 17. In some embodiments, only the inner radial surface of the member 484 is arcuate to match the outer surface 461 if the annular runner 451. The cutout 455 is configured to receive the radially-extending member 482 of the insert 453. On account of the complementary shapes of the insert 453 and the cutout 455, the surface area of the annular runner 451 and the insert 453 bonded by the braze layer 457 can be increased by bonding the inserts 453 to the annular runner 451 along the outer radial surface 461 of the annular runner 451 as shown in FIG. 17.

Figure 18:
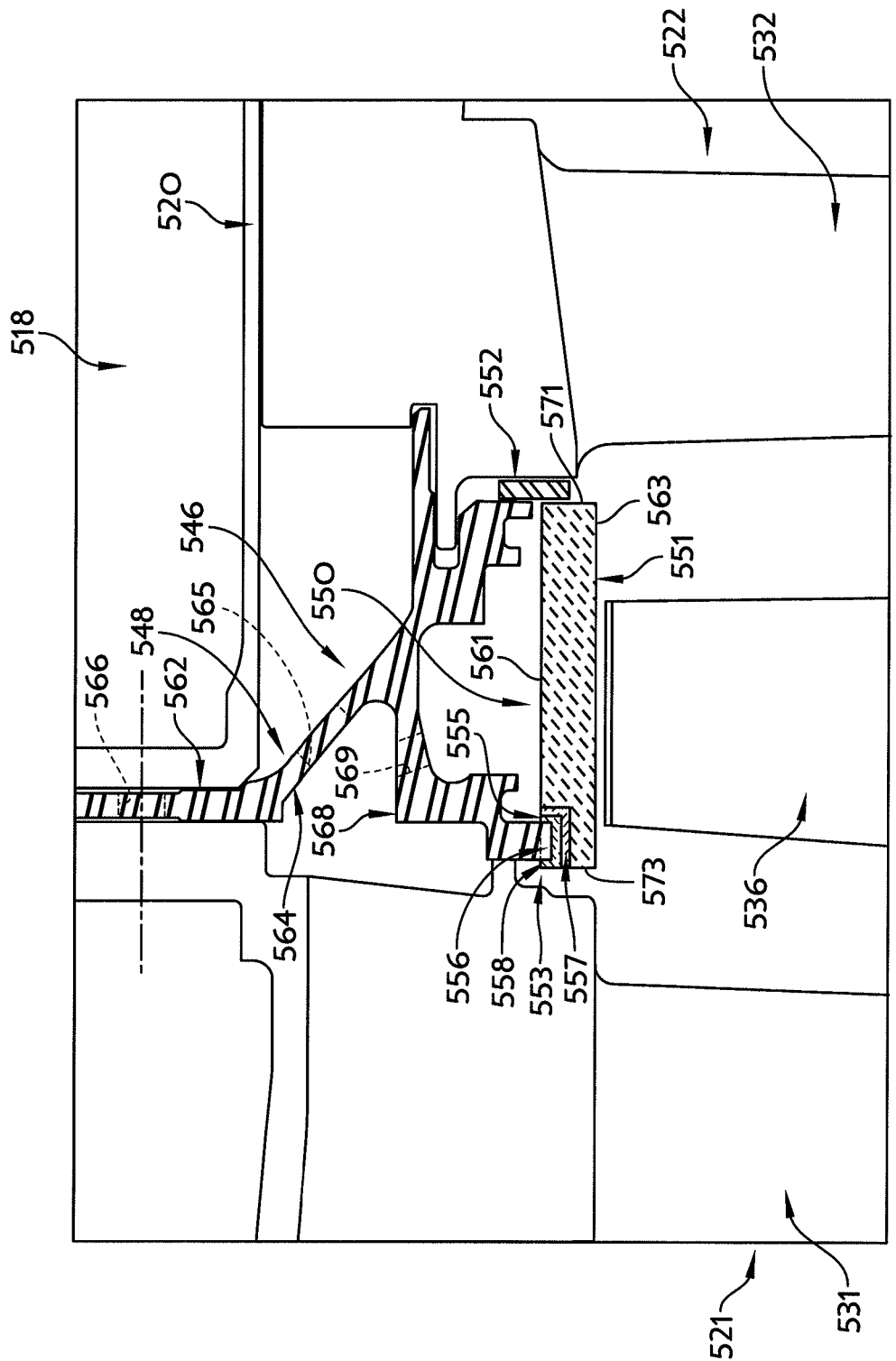
FIG. 18 is a partial cross-sectional view of another turbine section for use in the gas turbine engine of FIG. 1 showing the arrangement of another turbine shroud providing a track for blades of a turbine wheel assembly.
Figure 19:
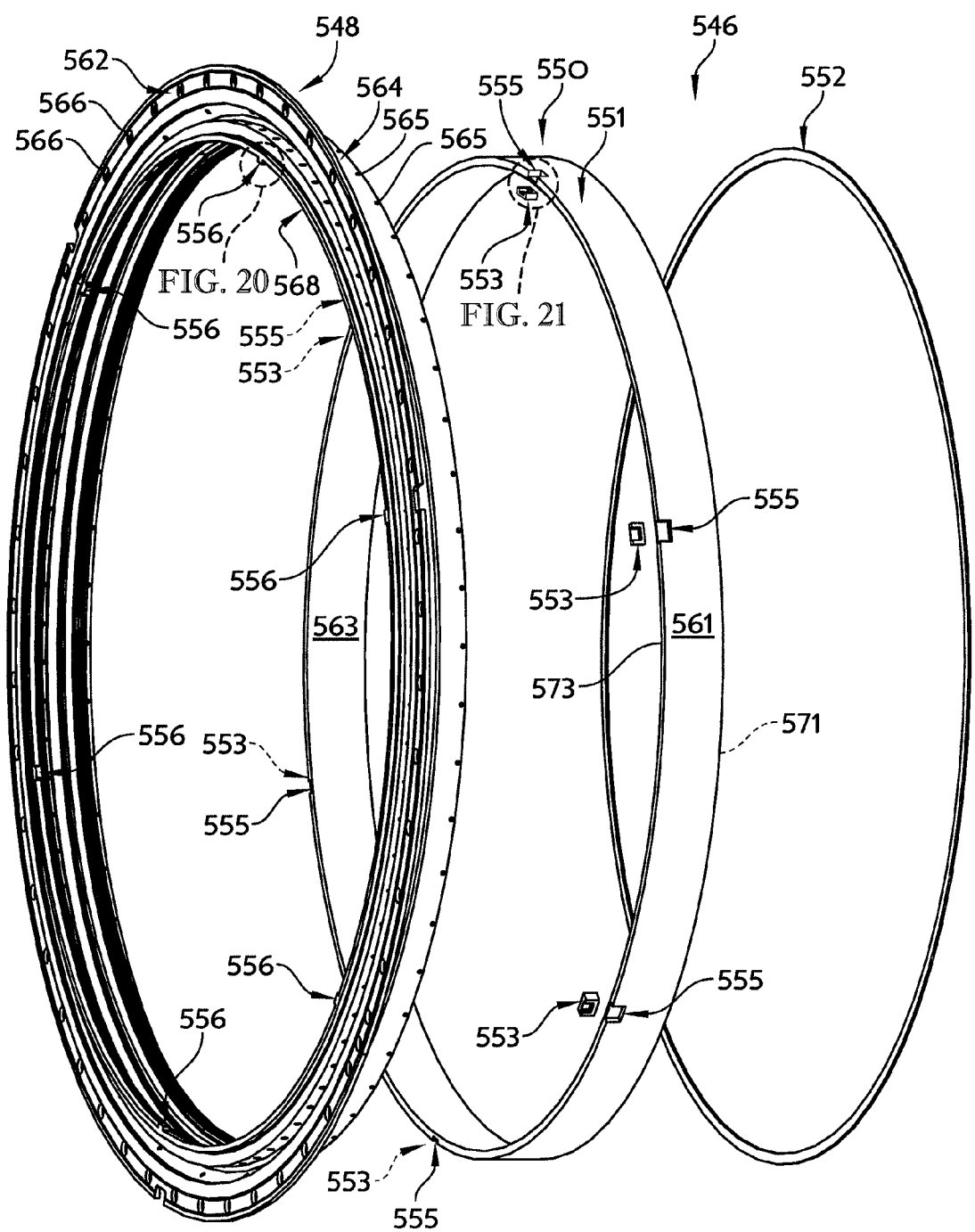
FIG. 19 is an exploded perspective view of the turbine shroud included in the gas turbine engine shown in FIG. 18 showing that the turbine shroud includes a carrier, a blade track, and a retainer.
Figure 20:
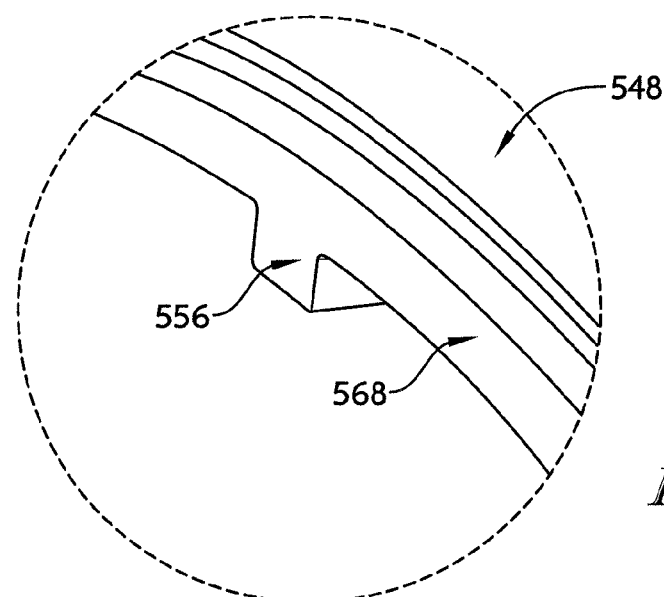
FIG. 20 is a detail perspective view of the carrier included in the turbine shroud shown in FIG. 19 showing that the carrier includes a key extending inward in a radial direction.

Another illustrative turbine 518 is shown in FIG. 18. The turbine 518 is configured for use in the engine 10 and is substantially similar to the turbine 18 shown in FIGS. 1 and 2. Accordingly, similar reference numbers in the 500 series indicate features that are common between the turbine 18 and the turbine 518. The description of the engine 10 and the turbine 18 is hereby incorporated by reference to apply to the turbine 518, except in instances when it conflicts with the specific description and drawings of the turbine 518.

Unlike the turbine 18, the turbine 518 includes a turbine shroud 546 in which the cross-key connection 554 is reversed such that the metallic carrier 548 includes the keys 556 and the blade track 550 includes the keyways 558 as shown in FIG. 18. Illustratively, the keys 556 are integrated into the carrier 548 and extend inward in the radial direction into the keyways 558. Correspondingly, the keyways 558 are formed in the inserts 553 included in the blade track 550.

Figure 22:
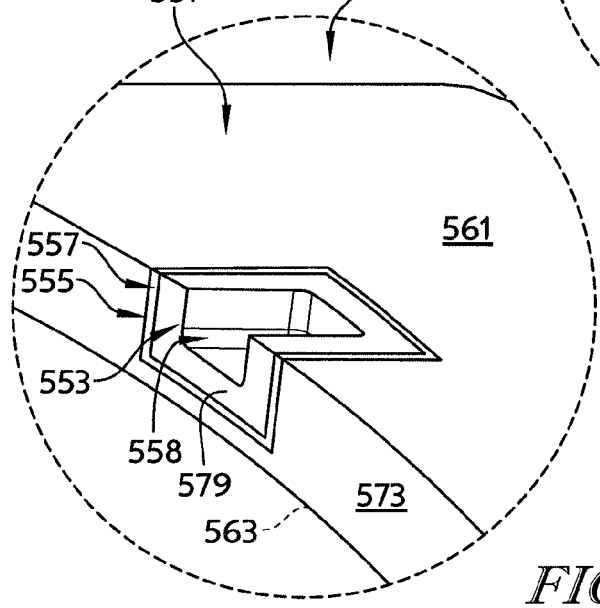
FIG. 22 is a detail perspective view of the blade track shown in FIG. 19 with the insert coupled to the annular runner and extending partway through the annular runner.

The illustrative inserts 553 extend inward in the radial direction from the outer radial surface 561 of the annular runner 551 as shown in FIG. 22. Additionally, a forward axial surface 579 of the illustrative insert 553 is coplanar with the forward axial surface 573 of the annular runner 551.

Figure 21:
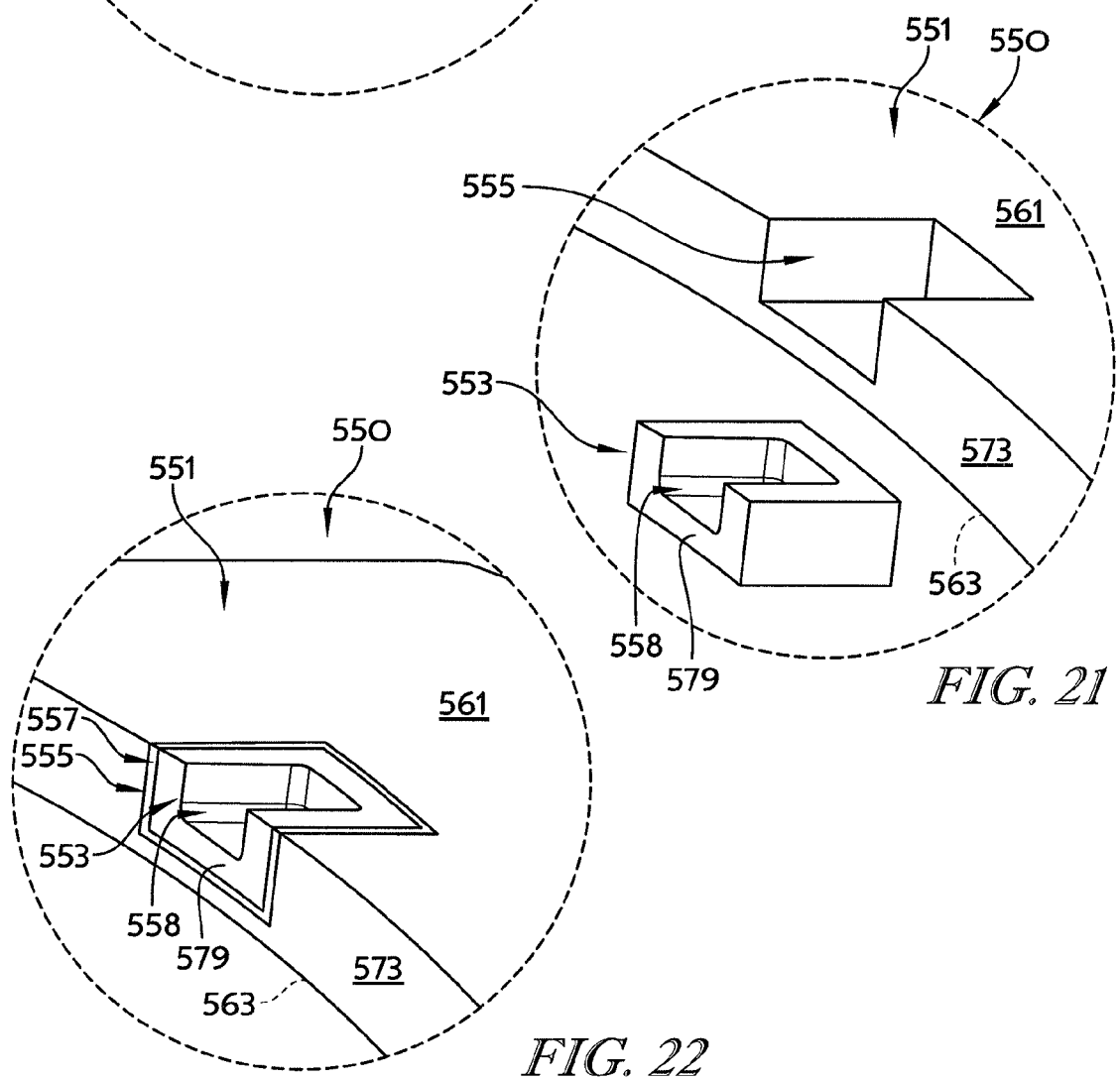
FIG. 21 is a detail perspective view of the blade track included in the turbine shroud of FIG. 19 showing that the blade track includes an annular runner and an insert formed to include a keyway.
Figure 24:
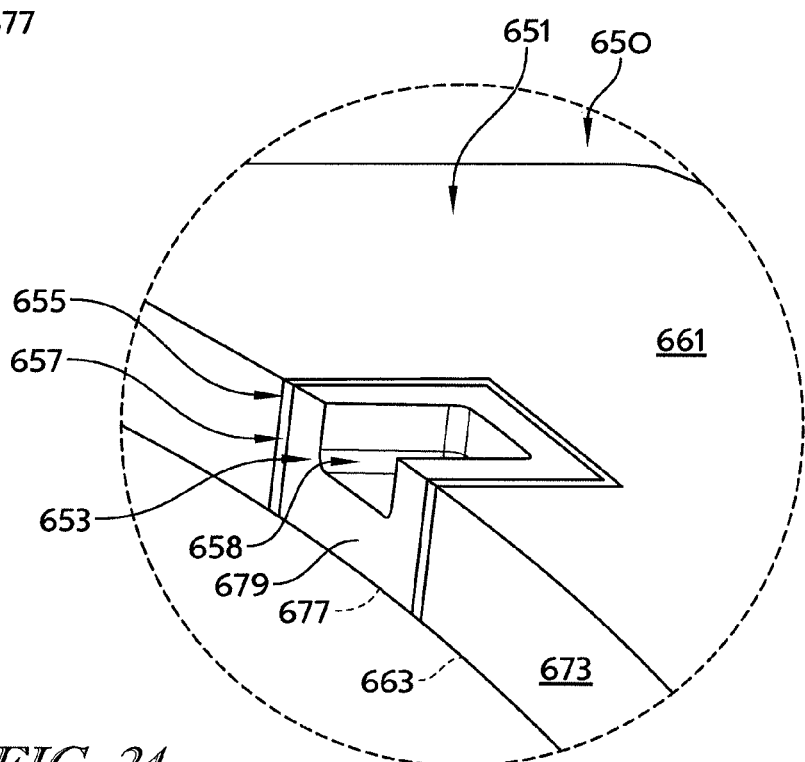
FIG. 24 is a detail perspective view of the blade track shown in FIG. 23 with the insert coupled to the annular runner by a braze layer, and showing the insert extending all the way through the annular runner.

The cutouts 555 are illustratively arcuate and sized to receive the insert 553 as shown in FIG. 22. In other embodiments, the cutouts 555 may have other shapes corresponding the inserts 553. The illustrative cutouts 555 extend inward in a radial direction partway through the annular runner 551 from an outer radial surface 561 toward an inner radial surface 563 of the annular runner 51 as shown in FIG. 21. In other embodiments, the cutouts 555 may extend all the way through the annular runner 551 in the radial direction (as shown in FIG. 24). Further, the illustrative cutouts 555 extend in the axial direction partway through the annular runner 551 from the forward axial surface 73 toward the aft axial surface 571 of the annular runner 551 as shown in FIG. 21.

Figure 23:
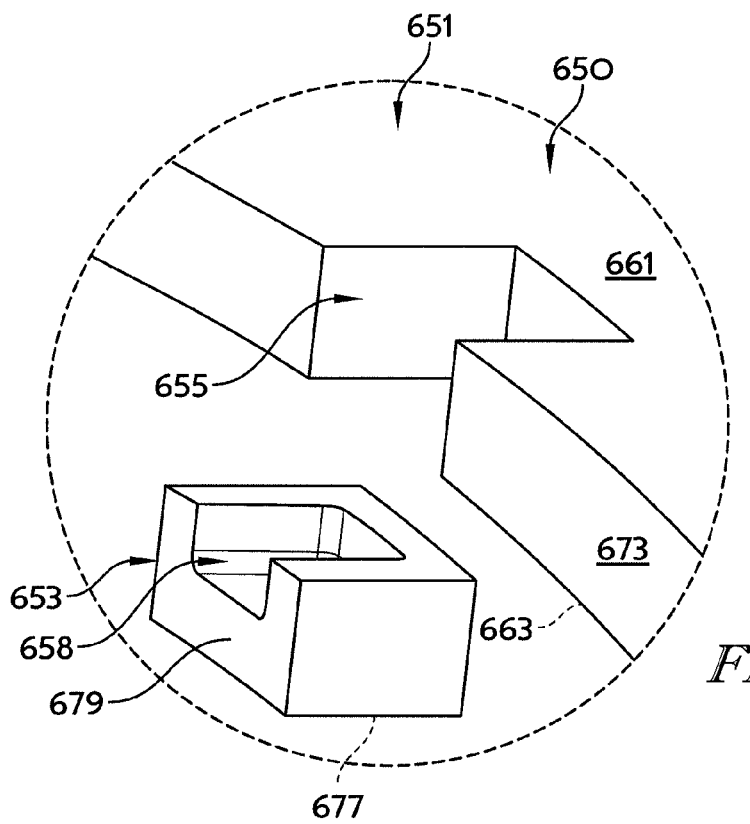
FIG. 23 is a detail perspective view of another blade track adapted for use in the turbine shroud of FIGS. 18 and 19 showing that the blade track includes an annular runner and an insert formed to include a keyway.

Another illustrative blade track 650 is shown in FIGS. 23 and 24. The blade track 650 is configured for use in engine 10 and is substantially similar to the blade track 550 shown in FIGS. 18-22 and described herein. Accordingly, similar reference numbers in the 600 series indicate features that are common between the blade track 550 and the blade track 650. The description of the engine 10 and the blade track 550 is hereby incorporated by reference to apply to the blade track 650, except in instances when it conflicts with the specific description and drawings of the blade track 650.

Unlike blade track 550, the cutout 655 of the annular runner 651 included in the blade track 650 extends all the way through the annular runner 651 from the outer radial surface 661 through the inner radial surface 663 as shown in FIG. 23. Additionally, the inserts 653 are arcuate (meaning inner and outer radial surfaces are curved to match the annular runner 651) and are coupled to the annular runner 651 so that an inner radial surface 677 of each insert is coextensive with the inner radial surface 663 of the annular runner 651 as shown in FIG. 11.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine blade track comprising
   an annular ceramic runner formed to include a plurality of cutouts extending inward in a radial direction from an outer radial surface of the annular ceramic runner toward an inner radial surface of the annular ceramic runner, and
   a plurality of inserts each arranged to extend into a corresponding one of the plurality of cutouts formed in the annular ceramic runner from the outer radial surface of the annular ceramic runner toward the inner radial surface of the annular ceramic runner, wherein each of the inserts has an arcuate inner radial surface that is coextensive with an inner radial surface of the annular ceramic runner.

2. The turbine blade track of claim 1, further comprising a plurality of braze layers arranged between the annular ceramic runner and each of the plurality of inserts.

3. The turbine blade track of claim 1, wherein each of the plurality of inserts extend outward in the radial direction from the outer radial surface of the annular ceramic runner to form keys included in the turbine blade track.

4. A turbine blade track comprising
   an annular ceramic runner formed to include a plurality of cutouts extending inward in a radial direction from an outer radial surface of the annular ceramic runner toward an inner radial surface of the annular ceramic runner, and
   a plurality of inserts each arranged to extend into a corresponding one of the plurality of cutouts formed in the annular ceramic runner from the outer radial surface of the annular ceramic runner toward the inner radial surface of the annular ceramic runner, wherein each of the plurality of inserts is cross-shaped and includes a radially-extending member and a circumferentially-extending member, and wherein the radially-extending members and the circumferentially-extending members of each of the plurality of inserts are at least partially received in a corresponding one of the plurality of cutouts.

5. The turbine blade track of claim 1, wherein each of the plurality of inserts includes an aft axial surface that is coplanar with an aft axial surface of the annular ceramic runner.

6. A turbine blade track comprising
   an annular ceramic runner formed to include a plurality of cutouts extending inward in a radial direction from an outer radial surface of the annular ceramic runner toward an inner radial surface of the annular ceramic runner, and
   a plurality of inserts each arranged to extend into a corresponding one of the plurality of cutouts formed in the annular ceramic runner from the outer radial surface of the annular ceramic runner toward the inner radial surface of the annular ceramic runner, wherein each of the plurality of inserts is formed to include a keyway extending inward in the radial direction from an outer radial surface of each insert and each keyway has circumferential sides configured to engage a corresponding key included in a carrier to block rotation of the turbine blade track about a central axis of the annular ceramic runner when coupled to the carrier.

7. The turbine blade track of claim 6, wherein the keyway of each of the plurality of inserts extends aft from a forward axial surface of each insert.

8. The turbine blade track of claim 1, wherein the annular ceramic runner consists essentially of ceramic matrix composite.

9. The turbine blade track of claim 8, wherein the insert consists essentially of ceramic matrix composite.

* * * * *